United States Patent

[11] 3,569,720

[72] Inventor Thorbjoern Roland Fredriksen
 Sunnyvale, Calif.
[21] Appl. No. 789,281
[22] Filed Jan. 6, 1969
[45] Patented Mar. 9, 1971
[73] Assignee Electroglas, Inc.,
 Menlo Park, Calif.

[54] PHOTOELECTRIC LIMIT SENSING ASSEMBLY AND SYSTEM
 7 Claims, 8 Drawing Figs.
[52] U.S. Cl. .................................................. 250/219,
 250/221
[51] Int. Cl. ..................................................... G06m 7/00

[50] Field of Search.......................................... 250/219
 (Rg), 221, 222, 223

[56] References Cited
 UNITED STATES PATENTS
 2,883,559 4/1959 Bailey.......................... 250/219

Primary Examiner—James W. Lawrence
Assistant Examiner—Martin Abramson
Attorney—Flehr, Hohbach, Test, Albritton & Herbert ABSTRACT: Photoelectric limit sensing assembly and system having photoelectric elements and logic arranged so that movement beyond a predetermined acceptable region is detected and which only permits movement in the proper direction to bring movement into the acceptable region.

INVENTOR.
Thorbjoern Roland Fredriksen

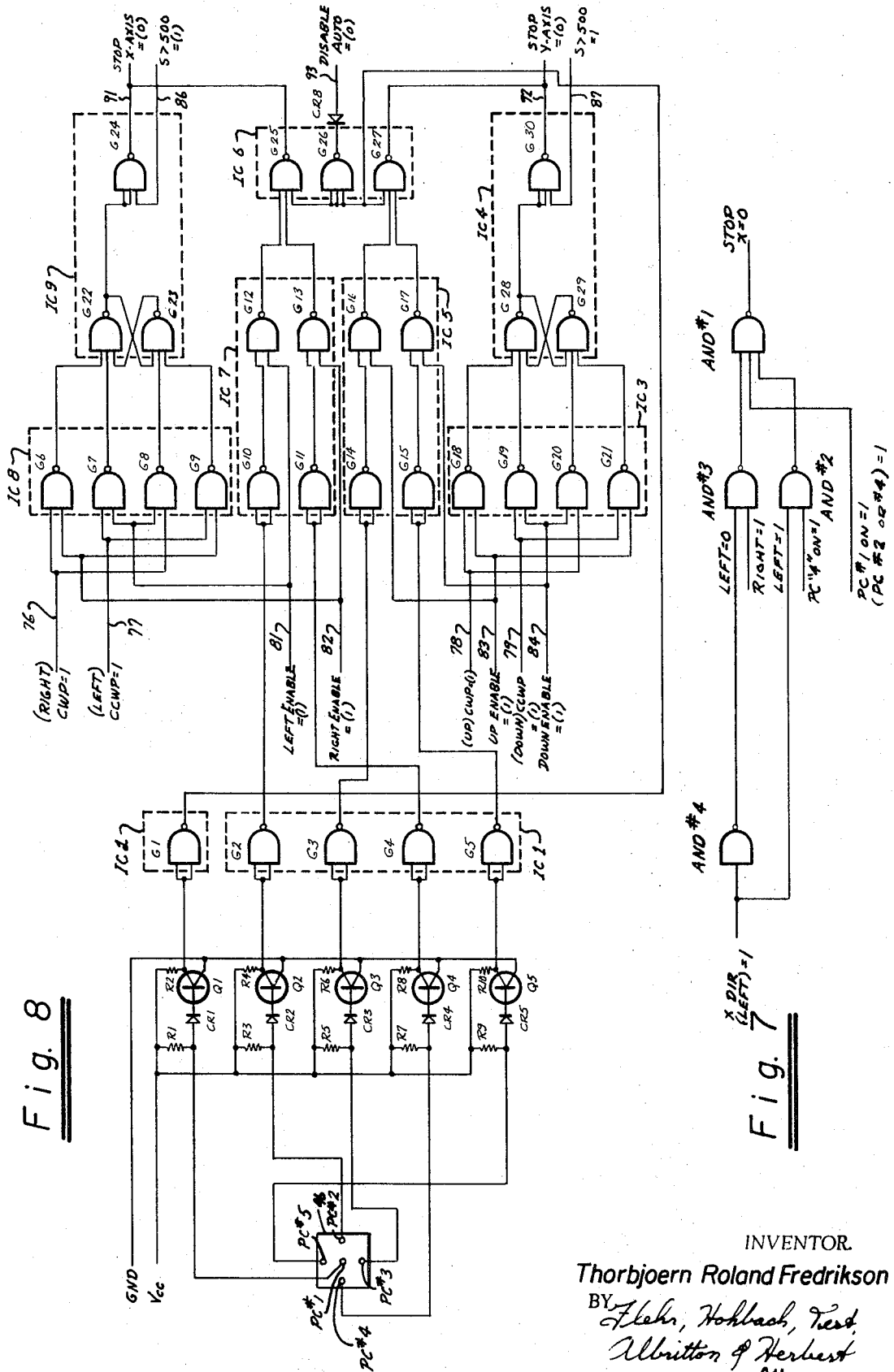

3,569,720

1

PHOTOELECTRIC LIMIT SENSING ASSEMBLY AND SYSTEM

BACKGROUND OF THE INVENTION

In the past, there have been provided devices for limiting movement in certain directions. However, with such devices the acceptable region was limited to a rectangular geometry. In wafer probing, the wafers are circular. In order to utilize as much of the wafer as possible, it is desirable to provide an acceptable region which is not limited to rectangular geometry. There is, therefore, a need for a new and improved photoelectric limit sensing assembly and system.

SUMMARY OF THE INVENTION AND OBJECTS

The photoelectric limit sensing assembly consists of a source of light and means forming a pattern lying in a plane through which light from the source can pass. The pattern is characterized in that an acceptable region is encompassed by a continuous line. Means is provided for carrying a plurality of photoelectric elements. The elements are arranged so that there is at least one row of photoelectric elements with at least two elements in each row. Means is provided for causing relative movement between the means forming a pattern and said means carrying said photoelectric elements. Logic is connected to the photoelectric elements for determining when movement outside the acceptable region has occurred and for permitting further movement only in a direction which will bring such further movement into the acceptable region.

In general, it is an object of the present invention to provide a photoelectric limit sensing assembly and system in which the geometry of the acceptable region is not limited to rectangular geometry.

Another object of the invention is to provide an assembly and system of the above character which serves to provide a maximum excursion limit and which is also fail-safe.

Another object of the invention is to provide an assembly and system which only permits return in safe directions.

Additional objects and features of the invention will appear from the following description in which the preferred embodiments are set forth in conjunction with the accompanying drawings.

BRIEF DESCRIPTION OF THE DRAWINGS

FIG. 7 is a simplified circuit diagram illustrating the logic utilized for one of the axes in the photoelectric limit sensing assembly.

FIG. 8 is a more detailed circuit diagram showing the logic utilized in the photoelectric limit sensing assembly.

DESCRIPTION OF THE PREFERRED EMBODIMENT

Figure 1:
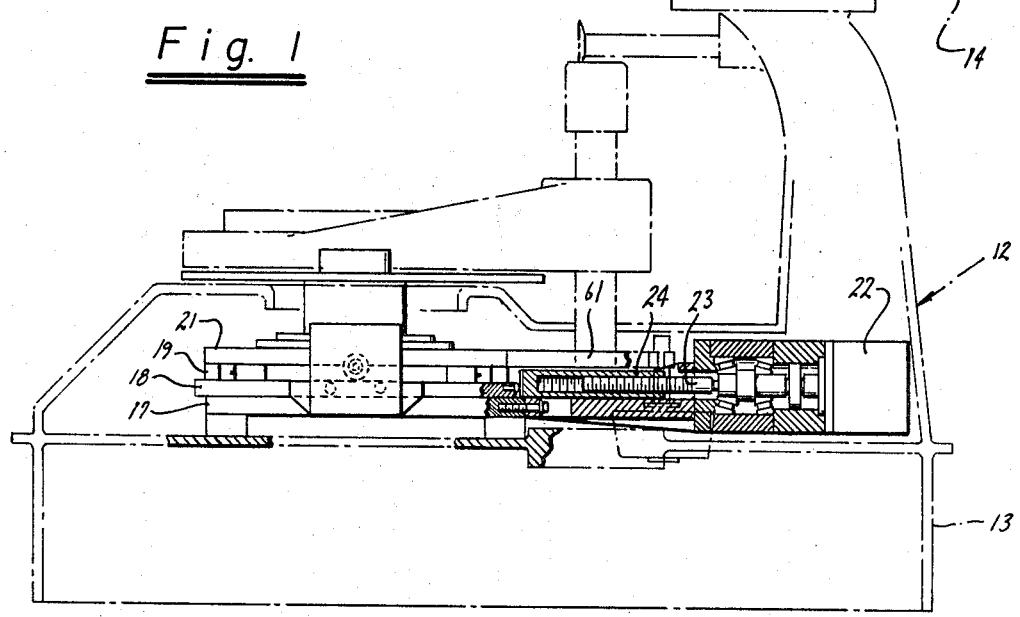
FIG. 1 is a cross-sectional view of a wafer probing machine having mounted thereon a photoelectric limit sensing assembly incorporating the present invention.
Figure 2:
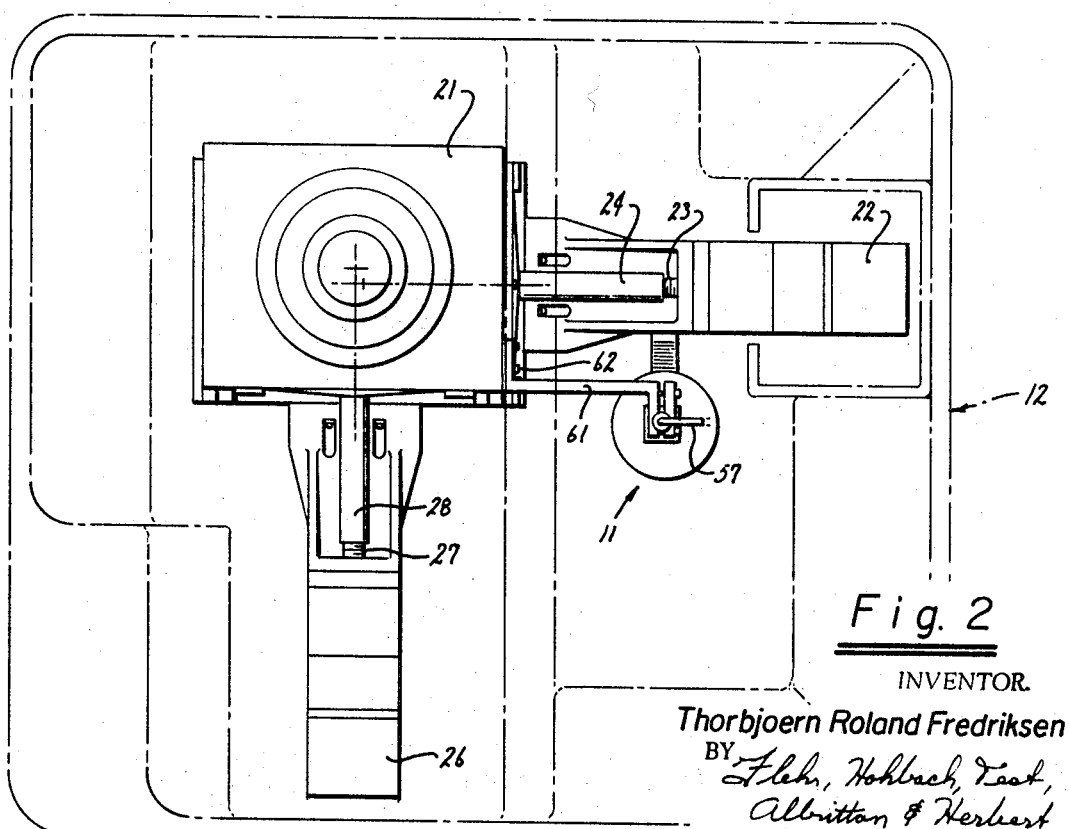
FIG. 2 is a plan view of certain parts of the machine shown in FIG. 1 and particularly showing the photoelectric limit sensing assembly.

The photoelectric limit sensing assembly 11 incorporating the present invention is mounted upon an automatic wafer die sorting machine of the type described in copending application Ser. No. 477,427, filed Aug. 5, 1965 now U.S. Pat. No. 3,437,929. As described in said copending application, said machine 12 consists of a base 13 upon which there is mounted a control console 14. A stage assembly 16 of the type therein described is mounted within the base 13. The stage assembly includes a bottom plate 17 and a movable plate 18 which is slidably mounted on the bottom plate 17 for movement in a direction which may be identified as the Y-axis and, alternatively, the vertical axis. Another movable plate 19 is slidably mounted upon the movable plate 18 for movement along the X horizontal axis or, in other words, in a direction at right angles to the direction of movement of the movable plate 18. A top plate 21 is mounted upon the movable plate 19.

Separate drive means is provided for driving each of the movable plates 18 and 19 along the X- and Y-axes. This drive means consists of a stepping motor 22 which drives a lead screw 23 threaded into an elongate nut 24 which is affixed to the movable plate 19. Similarly, another stepping motor 26 drives a lead screw 27 threaded into an elongate nut 28 affixed to the movable plate 18. Thus, when the stepping motor 22 is energized, the top plate is moved in an X-directin and, similarly, when the stepping motor 26 is energized, the top plate is moved in a Y-direction.

Figure 3:
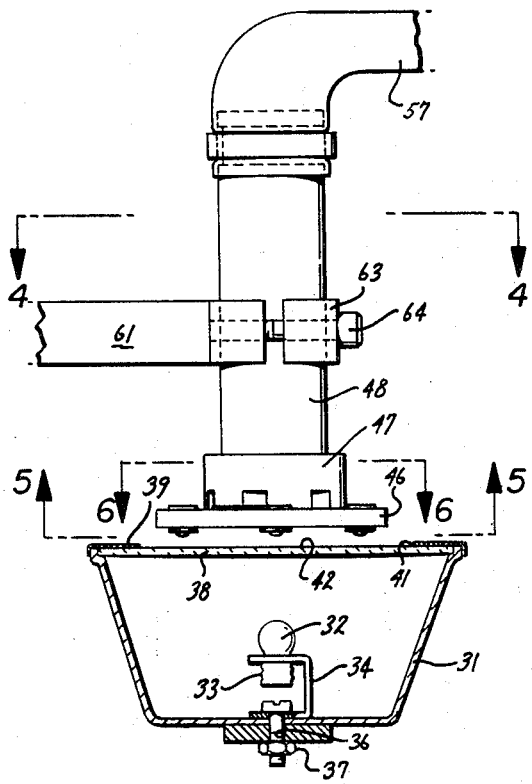
FIG. 3 is an enlarged detail view of the photoelectric limit sensing assembly incorporating the present invention.

The photoelectric limit sensing assembly 11 is mounted within the base 13 and consists of a cup-shaped housing 31 formed of a suitable material such as metal which is mounted in a fixed position upon the base 13. A source of light is provided within the housing 31 and consists of an incandescent lamp 32 which is mounted in a socket 33 carried by a bracket 34. The bracket 34 is provided with a threaded stud 36 secured thereto which extends through the housing 31 and is secured to the housing by a nut 37. As can be seen from FIG. 3, the lamp 32 is centrally disposed within the housing 31. The housing 31 has an open top side which receives a member 38 which is transparent or translucent with respect to light. The member 38 can be formed of any suitable material, such as a frosted plastic, which will diffuse the light evenly over the surface. Means is provided for forming a pattern on the surface and consists of an annular member 39 formed of a suitable opaque material. The annular member 39, for example, can be formed of black paint, tape or other suitable opaque material. The inner margin of the annular member 39 provides a continuous line 41 which defines an acceptable or substantially clear region 42 overlying the member 38 through which light from the source 32 can pass.

Figure 5:
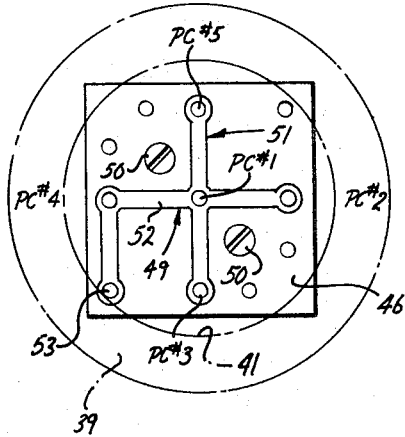
FIG. 5 is a cross-sectional view taken along the line 5—5 of FIG. 3.
Figure 4:
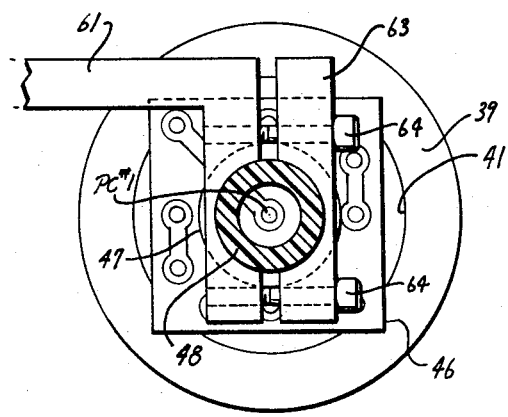
FIG. 4 is a cross-sectional view taken along the line 4—4 of FIG. 3.
Figure 6:
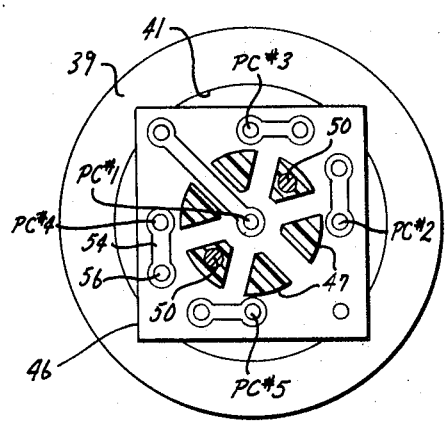
FIG. 6 is a cross-sectional view taken along the line 6—6 of FIG. 3.

Means is provided for carrying a plurality of photoelectric devices and consists of an X-Y photosensor board 46 formed of a suitable insulating material. The board 46 is provided with a hub 47 which is formed integral therewith and which is mounted upon a sleeve 48 also formed of an insulating material. Photosensitive devices or elements, often called photocells, are mounted upon the board 46 in a predetermined manner. The photosensitive devices or elements are mounted along two axes with two elements in each axis. Thus, as shown in FIG. 5, there is provided a photosensitive element identified as PC 01 which is centrally disposed on the board 46. Two rows 49 and 51 of photosensitive elements or devices are mounted on the board 46 with each of the rows including the photocell PC 01, Thus, there is shown in row 49, two additional photocells PC 02 and PC 04 which are arranged along an X-axis and are in alignment with the photocell PC 01. Similarly, two additional photocells PC 03 and PC 05 are provided along the Y-axis and in alignment with the photocell PC 01. The photocells are photosensitive devices and can be of any suitable type. For example, they can be of the semiconductor type such as supplied by Texas Instruments under Type No. LSX-600. When such devices are used, as shown in FIG. 5, all the emitters of the photosensitive devices can be interconnected by metal interconnecting elements 52 to a common emitter terminal 53 provided on the board of 46. The collectors of the photosensitive devices are connected by interconnecting elements 54 provided on the other side of the board to terminals 56. The terminals 56 are connected to wires (not shown) in a cable 57 which extends upwardly through the sleeve 48 and is connected to logic circuitry in the control console 14 in the manner hereinafter described.

Means is provided for causing relative movement between the region 42 and the photosensitive devices carried by the board 46 and consists of a bracket 61 which has one end secured to the top plate 21 by screws 62. The sleeve 48 is clamped to the bracket 61 by a clamp 63 secured thereto by screws 64. Thus, it can be seen that as the top plate 21 is moved, the board 46 with the photoelectric devices carried thereby will be shifted relative to the pattern 42 on the member 38 carried by the housing 31.

The photoelectric limit sensing assembly is connected to electronic circuitry of the type shown in FIGS. 7 and 8 to provide the system. In FIG. 7 there is shown a simplified schematic of the circuitry required for one axis, i.e., the X-axis. This circuitry, as hereinafter explained, is provided for two reasons. One is to ascertain when the relative movement between the means forming a pattern and the means carrying a plurality of photoelectric cells is beyond the acceptable region, and the other what movement is required to get back into the acceptable region after movement beyond the acceptable region.

In accomplishing these functions, the center photocell PC 01 actually serves as the actual limit detector and gives an indication when movement is beyond the acceptable region. The other four photocells PC 2—5 are provided for indicating the direction to return to the acceptable or substantially clear region 42. As hereinafter explained, the present arrangement is not limited to circular geometry as disclosed but an irregularly shaped geometry can be utilized, it only being necessary that the acceptable or clear region 42 be a continuous region which is defined by a single continuous line. The entire system will operate satisfactorily as long as one photocell gives an indication of the safe return direction.

The circuitry is connected in such a manner so that none of the four direction indicators in the form of the photocells PC 02, 3, 4 and 5 are operational unless the light to the center photocell PC 01 is blocked. In the machine which is shown in copending application Ser. No 477,427, filed Aug. 5, 1965, the assembly is utilized for ascertaining when movement of the probing heads has been into an undesired or unacceptable area to thereby stop automatic operation of the machine so that it can be shifted into the acceptable region 42.

As soon as cell 01 is darkened, the system becomes operational and it will block movement along the X- and Y-axes in the directions indicated by the other photocells. For example, if photocell 02 is darkened, it will block movement to the right and if photocell 03 is darkened, it will block movement in the down direction. If photocell 05 is darkened, it will block movement in the up and if photocell 04 is darkened, it will block movement to the left. Thus, let it be assumed that the relative motion has been such that movement has been into an undesired or unacceptable region, and photocell PC 01 has been darkened, and photocells PC 05, 3 and 4 have also been darkened. This means the only possible direction that movement could occur would be to the right because photocell PC 02 is the only one that is illuminated. The implementation of this logic is shown in FIG. 7 which shows the logic for the X-axis. As can be seen, the logic is provided with four AND gates identified as AND gate 01, AND gate 02, AND gate 03 and AND gate 04. AND gate 01 will block motion along the X-axis in both directions when certain conditions are met. As can be seen, AND gate 01 is a triple AND gate and thus three conditions have to be fulfilled. One of them is that photocell 01 must have an output which is equal to 1 which means that it must be darkened or covered. The other two inputs to the AND gate 01 are fulfilled as 1 if, first of all, the direction is not complemented by an illuminated photocell. Assume that relative movement has occurred so that photocell 04 is darkened and photocell 02 is still on. With photocell 04 darkened, this gives a 0 to AND gate 02 which will cause it to supply a 1 on its output to the input of AND gate 01. The AND gates are inverted so that when 1's are supplied to the inputs, the output is 0 and vice versa when a 0 is supplied to any one of the inputs of the AND gates, the output is a 1. Next, examining the AND gate 03, it is found that there is a 0 on one of the inputs because movement is to the left which supplies a 1 to the AND gate 01 so that the AND gate 01 has three 1's supplied to it so that AND gate 01 has a 0 on its output which is connected to circuitry (not shown) in the control console 14 to prevent further movement along the X-axis.

In order to permit movement along the X-axis, it is only necessary to change the direction of relative movement to the right. As soon as this occurs, one of the inputs on AND gate 03 is changed to a 1 from a 0 because the output from the AND gate 04 is a 1. Photocell 02 is still illuminated so another 1 is supplied to the other input of AND gate 03 so that the output of AND gate 03 is a 0 which causes the output of AND gate 01 to change to a 1 which cancels the stop order which previously had been supplied. Movement to the right can then occur to bring the movement into the acceptable region and as soon as photocell PC 01 is illuminated, normal operation can continue.

From the foregoing, it can be seen that the assembly and system prevents an operator from moving in any one direction beyond the acceptable or clear region and, in addition, only permits the operator to thereafter cause movement in the proper direction to bring the movement into the acceptable region.

The spacing between the photocells on the X- and Y-axes should be such that when relative movement is occurring at a predetermined speed, the machine should still be able to come to a stop shortly after photocell 01 is darkened and before photocell 02 is darkened. Thus, the spacing between the photocells should be sufficient to permit deceleration from the predetermined speed without covering the last photocell. In other words, one of the photocells always must be illuminated in order to give directions on which way to return to the acceptable operating region.

In order to utilize the principles herein set forth, it is desirable to provide at least three photocells per axis of movement. When there are two axes as, for example, X- and Y-axes, only a total of five photocells is required because one photocell is common to both axes. This is a minimum number when very sharp, well defined limits are desired without hysteresis. However, it should be pointed out that the principles of the present invention can be utilized with as few as two photocells per axis. With such an alternative, the center photocell PC 01 would be eliminated and its input to the AND gate 01 would be substituted from the outputs PC 02 or PC 04 equaling a 1 when they are dark as shown in FIG. 7 to provide the 1. The spacing between photocells 02 and 04 should be such that the space required for deceleration is not greater than the spacing between the photocells. The principal criteria for any of the embodiments is that at least one of the photocells must be left illuminated to give an indication of the free direction of movement and block the incorrect directions to prevent further movement into the unacceptable or forbidden areas.

A more detailed schematic of the logic utilized in the circuitry is shown in FIG. 8. The photocells PC 01—5 are capable of assuming two conditions, one when they are illuminated and the other when they are darkened. In the logic arrangement shown in FIG. 8, NPN phototransistors have been utilized for the photocells and such a transistor when they are illuminated provide an output which is equal to 0, and when they are darkened, will provide a positive output which is equal to a 1.

Each of the phototransistors or photocells is connected to a switching amplifier 71 which also serves as an inverting amplifier. The transistors for the five amplifiers are identified as Q1—Q5 and can be of a suitable type such as 2N3568. The diodes in the five amplifiers are identified as CR1—CR5 and can be of any suitable type such as 1N457. The diodes serve to raise the switching level, i.e., the $V_{be}$ point of the transistor by the forward voltage drop of the diode as, for example, by .6 of a volt to increase the noise immunity of the logic circuitry. The resistors for the amplifiers 71 have been identified as R1—R10 and have a suitable value such as 51K. The resistor R1 serves as a pullup resistor, whereas the resistor R2 serves as a collector load resistor for the first amplifier 71. The other resistors perform similar functions in the other amplifiers. The $V_{cc}$ which is supplied to the amplifiers is of a suitable voltage such as 4.75 volts positive.

The amplifiers 71 are discrete devices and their outputs are supplied to integrated circuits IC1 and IC2 which are formed of a plurality of two input NAND gates 73. The integrated circuits can be of any suitable type such as SP680A manufactured and sold by Signetics Corporation. Both inputs of the gates 73 are tied together so that the gates 73 merely serve as phase inverting devices and their outputs have been provided with indicia which indicate the functions which are performed when the photocells are darkened. For example, when photocell PC 01 is darkened, its output is a 1 which is applied to the phase inverting amplifier which provides a 0 to the input of the gate G1 so that its output is a 1. Thus, as hereinafter explained, when the output of the gate G1 turns to a 1, this serves as a stop limit signal. Similarly, when the output of gate G2 turns to a 1, it serves as a left limit signal. Similarly, when the output of gate G3 turns to a 1, it serves as an up limit signal; when the output of gate G4 turns to a 1, it serves as a right limit signal and when the output of gate G5 turns to a 1, it serves as a down limit signal. These directions of right and left and up and down are operator oriented directions who is viewing the probes of the machine through a microscope. They are the opposite of that when considering the direction of movement of the photocells.

Outputs of the gates G1—G5 are connected to certain additional gates as shown in the circuit in FIG. 8. The gates are formed as part of integrated circuits IC3, IC5 and IC7 which can be of any suitable type such as SP680A manufactured and sold by Signetics Corporation. The gates G22—G30 are triple input NAND gates and are also formed in integrated circuits IC4, IC6 and IC9 of a suitable type such as the SP670A manufactured by Signetics Corporation.

Certain additional information is supplied to the logic circuitry shown in FIG. 8 from the control console 14 of the machine disclosed in copending application Ser. No. 477,427, filed Aug. 5, 1965. Thus, there is provided on line 76 a plurality of positive pulses, each of which is equal to a 1 when the drive motor 22 is being supplied with pulses to drive it in a clockwise direction to shift the plate 19 to the right. Similarly, on line 77, there is supplied a plurality of pulses when the stepping motor 22 is driven in a counterclockwise direction to shift the plate 19 to the left. When pulses are supplied to the lines 76 or 77, these are equivalent to 1's being supplied to the gates G6 and G7. In the same manner, pulses are supplied to the lines 78 and 79 when pulses are being supplied to the motor 26 to rotate it in a clockwise direction to move the plate 18 in the "up" direction and pulses are supplied on the line 74 when the motor 26 is being rotated in a counterclockwise direction to move the plate 18 in the "down" direction.

The control console 14 also supplies steady state signals to the lines 81, 82, 83 and 84 at the appropriate times. For example, when movement of the plate 19 is to the right, a steady state signal would be applied to the line 82 which is supplied to one input of the gate 13. This signal appears on line 82 as long as movement to the right continues and would be present even if the motor 22 is not operating.

One type of signals are supplied to the lines 86 and 87 when the steps per second being made by the stepping motor are greater than 500. When this is the case, a 1 is supplied to the gates G24 and G30 depending upon which motor is in operation. This feature is provided to prevent travel or movement which would obscure all of the photocells. In other words, the motor must be travelling slow enough so that it can decelerate to a stop condition before the last photocell is reached.

Three output lines are provided from the logic circuitry shown in FIG. 8. The first one is line 91 which applies a 0 to stop further movement along the X-axis. The other is line 92 which supplies a 0 to stop further movement along the Y-axis. Line 93 supplies a 0 to disable further automatic operation of the machine.

By way of example, to explain the operation of the assembly and system, let it be assumed that the motor 22 is energized and rotating in a counterclockwise direction to shift the plate 19 to the left and that for some reason the machine is shifted far enough so that photocell 04 has been obscured and that photocell 01 is obscured. As soon as this occurs, photocell 01 produces a 1 on its output which is inverted by the amplifier 71 to a 0 and which is reinverted by the gate G1 to provide a 1. This 1 is supplied to all three inputs of the gate G26 to provide a 0 on its output which will immediately disable further automatic operation of the machine. Darkening the photocell 04 causes a 1 to be supplied on the output of gate G4. This causes a 1 to be supplied to both gates of gate G11 so that it has 0 on its output. This 0 is supplied to one of the inputs of gate G13. The other input of gate G13 also has a 0 on it because the left enable is in effect. This causes a 1 to be supplied on the output of G13 and this 1 is supplied to the center input of the gate G25. The lower input already has a 1 on it from the photocell PC 01. The top input of the gate G25 also has a 1 on it because the lower input of gate G12 has a 0 on it. The left enable line has a 0 on it. This causes a 0 to be supplied to the line 91 to stop movement along the X-axis.

This condition continues until the operator of the machine changes the enable signal from right to left which places a 1 on both inputs to gate G12. This places a 0 on one of the inputs of gate G25 and permits movement along the X-axis to return the movement into the acceptable region.

In summary, it can be seen that IC6 has three outputs which operate the X-stop, the Y-stop and the autostop controls. It is possible for all three controls to be actuated at once with one photocell still being uncovered to give the free direction of movement.

The integrated circuits IC5 and IC7 compare the direction presently commanded, for example, "left enable" with the status of direction limit, for example, "left limit" to produce positive outputs to decelerate the motors and bring them to a standstill. After this has occurred, further movement can only be made by changing the direction of movement, i.e., from left to right.

The integrated circuits IC8 and IC9 and IC3 and IC4 detect whether motor travel is a direction opposite to that commanded. If this occurs, the motor will be brought to a stop as soon as its speed drops below 500 steps per second by supplying a positive signal to the dot OR connections to lines 91 and 92. For example, if a right step CW = 1 is detected while left enable = 1, the output of gate G8 will go to a 0 for 10 milliseconds triggering flip-flop FF1 so that a 1 is supplied to gate G24 and to provide a 0 X-stop signal if the stepping spaced is below 500 per second.

It is apparent from the foregoing that there has been provided a photoelectric limit sensor assembly and system which is particularly unique in that it can be utilized with patterns of varying geometry and, in particular, is not limited to a rectangular geometry. It provides a fail-safe mode of operation and, in addition, in effect tells the operator in which direction to move in order to move into the acceptable region.

The assembly is relatively simple and can be incorporated in many types of equipment in which it is desired to limit movement within a predetermined acceptable region.

I claim:

1. In a a photoelectric limit sensing assembly and system, a source of light, means forming a pattern lying in a plane through which light from the source can pass, the pattern being characterized in that it is encompassed by a continuous line to define an acceptable region for movement, means carrying a plurality of photoelectric elements, said photoelectric elements being arranged so that there is at least one row of photoelectric elements with at least two elements in each row, means for causing relative movement between the means forming a pattern and said means carrying said photoelectric elements, and logic circuitry connected to said photoelectric elements for preventing movement beyond said acceptable region and for permitting movement only into said acceptable region after movement beyond the acceptable region has occurred.

2. In a photoelectric limit sensing assembly and system, a source of light, means forming a pattern lying in a plane through which light from the source can pass, the pattern being characterized in that it is encompassed by a continuous line to define an acceptable region for movement, means carrying a plurality of photoelectric elements, said photoelectric elements being arranged so that there are two rows of said photoelectric elements which intersect with three photoelectric elements in each row with two of the photoelectric elements representing directions, means for causing relative movement between the means forming a pattern and said means carrying said photoelectric elements for preventing movement beyond said acceptable region and for permitting movement only into said acceptable region after movement beyond the acceptable region has occurred.

3. An assembly and system as in claim 1 wherein said acceptable region is in the form of a circle.

4. An assembly and system as in claim 1 wherein said means carrying said plurality of photoelectric elements includes a planar member and wherein said photoelectric elements are mounted on said planar member.

5. An assembly and system as in claim 2 wherein said photoelectric elements are capable of assuming first and second conditions in response to receiving light or not receiving light and wherein said logic circuitry includes gate means for permitting movement in only those directions which are represented by photoelectric elements which are in one condition after movement beyond the acceptable region.

6. An assembly and system as in claim 5 wherein said logic circuitry also includes means for comparing the commanded direction of movement with actual direction of movement.

7. An assembly and system as in claim 5 wherein said logic circuitry includes means for preventing stopping of movement until the rate of movement is below a predetermined speed.